(12) United States Patent
Xiong et al.

(10) Patent No.: US 8,154,986 B2
(45) Date of Patent: Apr. 10, 2012

(54) METHOD FOR FAST CONVERGING END-TO-END SERVICES AND PROVIDER EDGE EQUIPMENT THEREOF

(75) Inventors: Yi Xiong, Guangdong (CN); Xiaoqian Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 10/591,121

(22) PCT Filed: May 30, 2006

(86) PCT No.: PCT/CN2006/001153
§ 371 (c)(1),
(2), (4) Date: Aug. 15, 2007

(87) PCT Pub. No.: WO2007/016834
PCT Pub. Date: Feb. 15, 2007

(65) Prior Publication Data
US 2008/0240121 A1    Oct. 2, 2008

(30) Foreign Application Priority Data
Aug. 5, 2005    (CN) .......................... 2005 1 0087707

(51) Int. Cl.
*H04L 12/24* (2006.01)
(52) U.S. Cl. ...................................... 370/216
(58) Field of Classification Search ........... 370/216–228
See application file for complete search history.

(56) References Cited

U.S. PATENT DOCUMENTS

| | | | |
|---|---|---|---|
| 7,343,423 B2 * | 3/2008 | Goguen et al. ............... | 709/239 |
| 7,535,828 B2 * | 5/2009 | Raszuk et al. ............... | 370/219 |
| 7,646,710 B2 * | 1/2010 | Christie, IV ................. | 370/230 |
| 2003/0002444 A1 | 1/2003 | Shin et al. | |
| 2003/0031125 A1 * | 2/2003 | Oyamada ...................... | 370/218 |
| 2003/0063560 A1 * | 4/2003 | Jenq et al. .................... | 370/216 |
| 2004/0114595 A1 | 6/2004 | Doukai | |
| 2006/0013125 A1 * | 1/2006 | Vasseur et al. ............... | 370/217 |

(Continued)

FOREIGN PATENT DOCUMENTS

| | | |
|---|---|---|
| CN | 1412985 A | 4/2003 |
| CN | 1553651 A | 12/2004 |
| CN | 101160801 A | 4/2008 |
| WO | 2005013050 A2 | 2/2005 |
| WO | WO2005039085 | 4/2005 |

OTHER PUBLICATIONS

First Chinese Office Action dated (mailed) Jan. 9, 2009, issued in related Chinese Application 200680012217.8 Huawei Technologies Co. Ltd.

(Continued)

*Primary Examiner* — Chirag Shah
*Assistant Examiner* — Jay P Patel
(74) *Attorney, Agent, or Firm* — Finnegan, Henderson, Farabow, Garrett & Dunner LLP

(57) ABSTRACT

A method for fast converging an end-to-end service and a Provider Edge (PE) includes: setting routing information of at least two tunnels in a double-ascription PE of a remote Customer Edge (CE), wherein, the two tunnels are from the double-ascription PE of the remote CE to the PE connected with the remote CE; detecting tunnel states to obtain state information of the tunnels; the double-ascription PE obtaining available routing information and routing information of the at least two tunnels, and forwarding the service according to the available routing information. The double-ascription PE of the remote CE can directly forward the service according to the pre-configured routing information of other tunnels when the current tunnel is unavailable, such as a terminal node of the current tunnel is abnormal, thereby avoids the procedure of re-selecting the route, and increases the end-to-end service convergence speed and improves the service reliability.

17 Claims, 1 Drawing Sheet

U.S. PATENT DOCUMENTS

2006/0153067 A1*  7/2006  Vasseur et al. .............. 370/217
2006/0193248 A1*  8/2006  Filsfils et al. .............. 370/216
2006/0262735 A1*  11/2006  Guichard et al. .......... 370/254

OTHER PUBLICATIONS

Park, J.T., "Management of BGP/MPLS VPN with Resilient Paths," Network Operations and Management Symposium, 2004. NOMS 2004. IEEE/IFI P Seoul, vol. 1, Apr. 19, 2004, XP010712583.

Sharma V. et al, "Framework for Multi-Protocol Label Switching (MPLS)-based Recovery; rfc3469.txt," IETF Standard, Internet Engineering Task Force, IETF, XP015009252, Feb. 2003.

Lasserre, M. et al, (editors) "Virtual Private LAN Services over MPLS; draft-ietf-l2vpn-vpls-ldp-07.txt, IETF Standard-Working-Draft, Internet Engineering Task Force, IETF, XP015041095, Jul. 2005".

Written Opinion of the International Searching Authority (translation) dated (mailed) Sep. 21, 2006, issued in related Application No. PCT/CN2006001153, filed May 30, 2006, Huawei Technologies Co., Ltd.

Extended European Search Report dated (mailed) Aug. 17, 2010, issued in related Application No. 06742041.4-2416/PCT/CN2006001153, filed May 30, 2006, Hauwei Technologies Co., Ltd.

European Patent Office Communication pursuant to Article 94(3) EPC, European search opinion for Application No. 06742041.4, mailed Feb. 28, 2011, Huawei Technologies Co., Ltd.

European Patent Office Communication pursuant to Article 94(3) EPC, European search opinion for Application No. 06742041.4-2416, mailed Dec. 13, 2011, Huawei Technologies C., Ltd 8 pgs.

* cited by examiner

METHOD FOR FAST CONVERGING END-TO-END SERVICES AND PROVIDER EDGE EQUIPMENT THEREOF

CROSS-REFERENCE TO RELATED APPLICATIONS

This application is a National Stage of Patent Cooperation Treaty (PCT) Application No. PCT/CN2006/001153, filed May 30, 2006, which claims priority to Chinese Patent Application No. 200510087707.1, filed Aug. 5, 2005, all of the disclosure of which are hereby incorporated by reference in their entirety.

FIELD OF THE TECHNOLOGY

The present invention relates to network communication technologies, more particularly to a method for fast converging an end-to-end service and Provider Edge (PE) equipment.

BACKGROUND OF THE INVENTION

At present, with the rapid development of network technologies, the demand for a united network, which consists of a cable television network, an Internet Protocol (IP) network and a telecommunication network, becomes more and more urgent. Network providers attach much importance to the service convergence speed when a network fails to function. When a node malfunctions, it is required that switching time for switching a service to a neighbor node is less than 50 ms, and the end-to-end service convergence time is less than 1 s, which have become a threshold of bearer networks.

In order to satisfy the requirement that the service switching time for switching to a neighbor node is less than 50 ms and the end-to-end service convergence time is less than 1 s, such techniques as Multi-Protocol Label Switching Traffic Engineering Fast Re-Routing (MPLS TE FRR) technique and Interior Gateway Protocol (IGP) routing fast convergence technique emerge.

In a double-ascription PE of a Customer Edge (CE) network model, the MPLS TE FRR is usually adopted for service fast switching when the network fails to function. Basic principles of the MPLS TE FRR are: an end-to-end Traffic Engineering (TE) tunnel is established between two PEs, and a backup Label Switching Path (LSP) is established beforehand for a primary LSP which needs protection. Therefore, when a PE detects that the primary LSP is unavailable, such as node malfunctions or link malfunctions, it will switch the traffic to the backup LSP to implement the fast service switching.

With reference to the accompanying FIG. 1, the MPLS TE FRR-based fast service switching under a double-ascription network model will be illustrated in detail hereinafter.

In FIG. 1, PE-E is a double-ascription PE of a remote CE, PE-A and PE-B are both connected to the remote CE, the network model also includes provider's equipment P-C and P-D. A path for an equipment CE-B to visit another equipment CE-A is configured as follows:

CE-B-PE-E-P-C-PE-A-CE-A;

When the node PE-A fails to function, the path for CE-B to visit CE-A is converged to:

CE-B-PE-E-P-D-PE-B-CE-A;

according to standard Multi-Protocol Label Switching Layer 3 Virtual Private Network (MPLS L3 VPN) techniques, firstly, both the PE-A and the PE-B will advertise routes directing to the CE-A to the double-ascription PE-E of the CE-A, and allocate private network labels.

The PE-E selects an optimal Virtual Private Network IPv4 route (VPN V4 route), which is transmitted by a Multi-Protocol Border Gateway Protocol (MP-BGP) neighbor, according to pre-configured strategies. Supposing that the PE-E selects the route advertised by the PE-A as the optimal route, then the PE-E fills in a forwarding item used by a forwarding engine only the routing information advertised by the PE-A, such as a forwarding prefix, an inner layer label, a selected outer layer tunnel, etc. Then the forwarding engine forwards the service according to the routing information.

As to link malfunctions and node malfunctions between the PE-E and the PE-A, wherein, the PE-E and the PE-A are the initial node and the terminal node of the TE tunnel respectively, the MPLS TE FRR can implement the fast service switching.

When the terminal node PE-A of the tunnel fails to function, what is generally adopted is that the CE-A detects the PE-A, which is directly connected with the CE-A, through a bidirectional path detection technique or other techniques. When the CE-A detects there is a malfunction in the PE-A, it will actively switch the traffic to the PE-B to recover the service. But the PE-E can detect the malfunction of the PE-A only through information, such as a Border Gateway Protocol (BGP) neighbor breaks down or an outer layer LSP tunnel is unavailable, etc., and the PE-E re-selects the VPN V4 route advertised by the PE-B. Meanwhile, the PE-E fills in the forwarding item of the forwarding engine with the new routing information, and the forwarding engine forwards the service according to the new routing information, thereby implementing the end-to-end service convergence.

Before the PE-E fills the corresponding forwarding item with the route advertised by the PE-B, the terminal node of the outer layer LSP tunnel directed by the forwarding item of the forwarding engine of the PE-E is the PE-A all the time, and the PE-A has failed to function, therefore during the period from the malfunction appearing in the PE-A to the PE-E filling in the forwarding item with the route advertised by the PE-B, the CE-B is unable to access the CE-A, and the end-to-end service is interrupted.

When the terminal node PE-A fails to function, the time for recovering the normal service transmission mainly depends on the service convergence time which is closely related to the number of the MPLS VPN inner routes and the number of hops of a bearer network. Typically, the service convergence time is about 5 s, which is far from the requirement that the end-to-end service convergence time should be less than 1 s, moreover, the end-to-end service convergence time will increase significantly with the increase in the number of the MPLS VPN private network routes.

SUMMARY OF THE INVENTION

The present invention provides a method for fast converging an end-to-end service, so as to increase convergence speed of the end-to-end service as well as the service's reliability. The present invention also provides a Provider Edge (PE) that can improve the convergence speed of the end-to-end service.

A method for fast converging an end-to-end service includes:

setting routing information of at least two tunnels in a double-ascription PE of a remote Customer Edge (CE), wherein, the initial node of the tunnels is the double-ascription PE of the remote CE, and the terminal node of the tunnels is the PE which is connected with the remote CE;

detecting tunnel states to obtain state information of the tunnels;

the double-ascription PE of the remote CE obtaining available routing information according to the tunnel state information and routing information of the at least two tunnels, and forwarding the service according to the available routing information.

The present invention also provides a PE for fast converging an end-to-end service, including: a storage module, a tunnel state detecting module and a forwarding module; wherein, the storage module is configured to store routing information and tunnel state information of at least two tunnels, whose originate node and terminal node is a double-ascription PE of a remote CE and a PE connected with the remote CE respectively, and configured to store tunnel state information of the at least two tunnels; and the tunnel state detecting module is configured to detect tunnel states and update the tunnel state information stored in the storing module when the tunnel state is changed; and the forwarding module is configured to obtain available routing information according to the routing information and the tunnel state information of the at least two tunnels stored in the storing module, and configured to forward service according to the available routing information.

It can be seen from the above-mentioned technical scheme that, by setting routing information for multiple tunnels, which are mutual backup tunnels or load sharing tunnels, in a double-ascription PE of a remote CE, and by detecting state information of the tunnels, it is possible for the double-ascription PE of the remote CE to forward the service directly according to the state information of the backup tunnel when the tunnel is unavailable, such as when a terminal node of the tunnel functions abnormally, thereby avoiding the procedure of re-selecting the optimal route. In addition, the end-to-end malfunction detection time can be less than 500 ms, even reaching 50 ms, by detecting an unavailable state of the tunnel using techniques such as BFD, tunnel fast convergence, etc. The end-to-end malfunction detection time is independent of the private network route numbers that the MPLS VPN network bears. Furthermore, it is possible to quickly and conveniently obtain the routing information of the mutual backup tunnels or the mutual load sharing tunnels by setting routing information. Therefore, the technical solution of the present invention can improve the service's reliability by increasing the end-to-end service convergence speed.

DETAILED DESCRIPTION OF THE INVENTION

Figure 1:
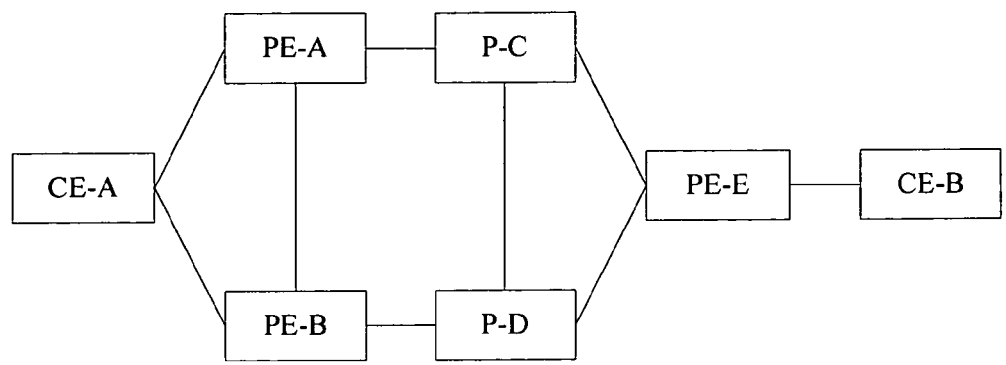
FIG. 1 is a schematic diagram illustrating a double-ascription network model.

To make the technical solution and the advantages of the present invention clearer, the present invention will be illustrated in detail hereinafter with reference to the accompanying embodiments.

The tunnel in the embodiment of the present invention includes an inner layer and an outer layer. Wherein, the inner layer tunnel can be a VPN, while the outer layer tunnel can be an LSP tunnel or a GRE tunnel or an IPSec tunnel, etc. The type of the outer layer tunnel is not limited in this embodiment.

Firstly, in the present embodiment, it is needed to select routing information of at least two tunnels whose initial node is a double-ascription PE of a remote CE and terminal node is a PE connected with the remote CE. The double-ascription PE of the remote CE can forward data packets of a nearby CE to the remote CE through any one of the above-mentioned tunnels.

For example, if the inner layer tunnel is the VPN and the outer layer tunnel is the LSP tunnel, the method for selecting routing information of at least two tunnels includes:

the double-ascription PE of the remote CE selects a VPN V4 route in accordance with pre-defined conditions according to the pre-configured matching strategies. As to those selected VPN V4 routes, optimal routing information is selected in the present embodiment, in addition, one or more suboptimal routing information are selected. The above-mentioned routing information includes forwarding prefix, inner layer label, selected outer layer tunnel, etc.

And then, the double-ascription PE of the remote CE stores the above-mentioned optimal and suboptimal routing information. The double-ascription PE of remote CE can fill in the forwarding items of the route forwarding table in the forwarding engine with both the optimal routing information and the suboptimal routing information.

The above-mentioned at least two tunnels, whose initial node is the double-ascription PE of the remote CE and terminal node is the PE connected with the remote CE, can be a primary tunnel and a backup tunnel which are mutual backup tunnels, and there can be one or more backup tunnels. The above-mentioned at least two tunnels can also be mutual load sharing tunnels, and there can be two or more of them.

After setting the above-mentioned routing information, the double-ascription PE of the remote CE can detect the state of the tunnel by the BFD technique, tunnel fast convergence technique such as LSP fast convergence, or other techniques. When the double-ascription PE of the remote CE confirms that the state of the tunnel is changed, it will set the corresponding identifier in the LSP tunnel state table configured in itself as the new state information of the tunnel. Meanwhile, the double-ascription PE of the remote CE advertises the state information of the tunnel to the forwarding engine. For example, when the control layer of the double-ascription PE of the remote CE determines that the state of the primary tunnel has become unavailable from the state of available, it modifies the identifier corresponding to the state of the tunnel in the LSP tunnel state table to be unavailable, and at the same time, advertises the unavailable state of the primary tunnel to the forwarding engine. Thus when the forwarding engine of the double-ascription PE of the remote CE desires to forward data packets through the primary tunnel, if the state of the primary tunnel is confirmed to be unavailable, the forwarding engine will forward the data packets according to the pre-configured routing information of the backup tunnel it stores. After the forwarding engine of the double-ascription PE of the remote CE determines that the primary tunnel is unavailable, it can further judge the state of the backup tunnel, and forwards the data packets according to the pre-configured routing information of the backup tunnel when the backup tunnel is available, thereby implementing the fast convergence of the end-to-end service.

When the mutual load sharing tunnels are adopted by the forwarding engine of the double-ascription PE of the remote CE to forward data packets, it is necessary to check the state of each one of the mutual load sharing tunnels, and select a corresponding tunnel to forward the data packets according to the state of each tunnel. If there are two tunnels which act as load sharers mutually, wherein, one of them is unavailable while the other is available, the data packets will be forwarded through the tunnel in the available state, the detailed implementation is similar to the above-mentioned procedure of forwarding data packets through the primary and backup tunnels, which will not be illustrated herein.

In order to make it convenient for the forwarding engine of the double-ascription PE of the remote CE to obtain the state information of the tunnel when forwarding data packets, a tunnel state field can be added in the route forwarding table of the forwarding engine. When the routing information in the forwarding item is the routing information of the primary and backup tunnels, the tunnel state field can only mark the state of the primary tunnel, or mark the states of both the primary and the backup tunnel. When the routing information in the forwarding item is the routing information of the mutual load sharing tunnels, the tunnel state field marks the state information of the mutual load sharing tunnels. Thus, when the forwarding engine selects a forwarding item of a primary tunnel or a mutual load sharing tunnel, it can determine the state of the tunnel according to the content of the tunnel state field in the forwarding item. The tunnel state information can also be independent of the route forwarding table, and can be stored in an independent storage unit. When the forwarding engine selects a forwarding item of a primary tunnel or a mutual load sharing tunnel, it can determine the state of the tunnel according to the tunnel state information stored in the independent storage unit, and perform the subsequent operations.

When the primary tunnel or one of the mutual load sharing tunnels fails to function, in order to make it convenient for the forwarding engine of the double-ascription PE of the remote CE to obtain the routing information of the backup tunnel or other tunnel(s) of the mutual load sharing tunnels, the present embodiment can further set the routing information of the backup tunnel in the route forwarding table of the primary tunnel, or set the routing information of each one of the mutual load sharing tunnels in the route forwarding table of other tunnels. Thus, when the forwarding engine selects a primary tunnel or one of the mutual load sharing tunnels, if the primary tunnel or the selected mutual load sharing tunnel is unavailable, it can obtain the routing information of the backup tunnel or other mutual load sharing tunnel(s) directly from the item.

The method for fast converging an end-to-end service according to the present embodiment will be illustrated hereinafter with reference to the accompanying FIG. 1, with the primary tunnel and backup tunnel taken as an example.

In FIG. 1, CE-A is a remote CE, CE-B is a nearby CE, PE-E is a double-ascription PE of the CE-A, and the PE-A and PE-B are directly connected to the CE-A.

Both the PE-A and the PE-B will advertise routes to the CE-A and allocate private network labels to the double-ascription PE-E of the CE-A. The PE-EA selects a VPN route advertised by a PE which is directly connected with the remote CE as the optimal route according to the pre-configured strategies, and selects another VPN route which is directly connected with the remote CE as the suboptimal route.

Supposing that the optimal route is the route advertised by the PE-A, and the suboptimal route is the route advertised by the PE-B. Then the PE-E will fill in the forwarding table of the forwarding engine with the routing information, such as forward prefix, inner layer label, the selected outer layer LSP tunnel, etc., advertised by the PE-A and the PE-B. Wherein, the route advertised by the PE-A is the primary route, and the route advertised by the PE-B is the backup route.

The method of the PE-E storing the routing information advertised by the PE-A and the PE-B in the forwarding table of forwarding engine is: storing the optimal routing information advertised by the PE-A in an item of the forwarding table, the item also includes the tunnel state information of the optimal route and the routing information of the suboptimal route.

There is an LSP tunnel state table in the control layer of the PE-E, and the table stores the state information of each tunnel.

When the node PE-A fails to function, the control layer of the PE-E can detect that the outer layer tunnel between the PE-E and the PE-A is unavailable through such techniques as BFD and LSP fast convergence. Typically, the time for detecting an end-to-end malfunction is less than 500 ms, even reaching 50 ms.

After the control layer of the PE-E detects that the outer layer LSP tunnel on which the MPLS VPN relies is unavailable, it sets the corresponding identifier in the LSP tunnel state table of the control layer as unavailable. Meanwhile, it advertises the unavailable information of the tunnel to the forwarding engine.

After the forwarding engine selects an item of the route forwarding table, e.g., the item of the primary tunnel, it checks the LSP tunnel state corresponding to the item. If the primary tunnel is unavailable, the forwarding engine will forward data packets according to the routing information of the suboptimal route in the item. Thus, an inner layer label assigned by the PE-B will be attached on the packets, and the packets will be switched to the PE-B through the tunnel between the PE-E and the PE-B, and then forwarded to the CE-A, thereby recovering the service in the CE-B to CE-A direction, and implements the fast convergence of the end-to-end service when the PE-A fails to function.

Figure 2:
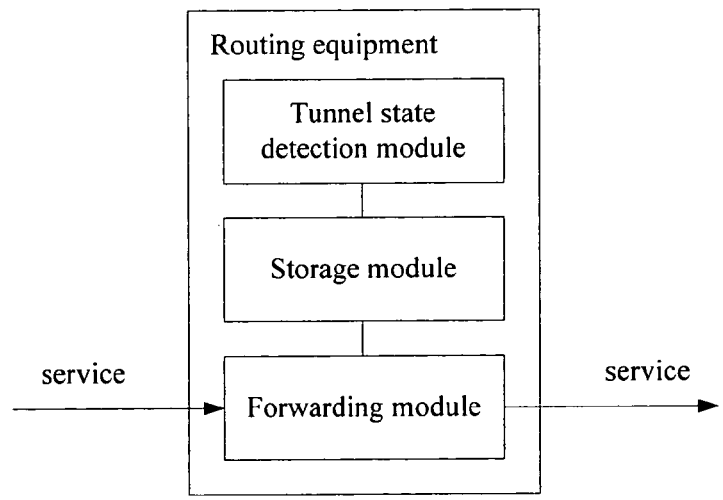
FIG. 2 is a schematic diagram illustrating a PE according to an embodiment of the present invention.

The present embodiment also provides a double-ascription PE of a remote CE, i.e. routing equipment for implementing fast convergence of end-to-end service, as shown in FIG. 2.

With reference to FIG. 2, the PE in accordance with the present embodiment includes: a storage module, a tunnel state detecting module and a forwarding module.

The storage module is configured to store routing information and tunnel state information of the at least two tunnels, whose initial node is the double-ascription PE of the remote CE and the terminal node is the PE connected with the remote CE. The above mentioned routing information and tunnel state information can exist in the form of a route forwarding table of the forwarding engine. And the routing information and the tunnel state information of the above-mentioned at least two tunnels can be stored in a forwarding table item of the route forwarding table. The routing information of the primary tunnel can include: routing information of the primary tunnel, tunnel state information of the primary tunnel, routing information of the backup tunnel, etc. The above-mentioned routing information and tunnel state information can also exist in the other forms. The storage module can be located in each forwarding engine of the PE.

The tunnel state detecting module is configured to detect tunnel states, sent the tunnel state change information to the storage module, and update the tunnel state information stored in storage module. The tunnel state detecting module itself can also store the tunnel state information, which can be stored in form of a tunnel state table of the control layer. The tunnel state detecting module can detect the state of the tunnel by such techniques as the BFD, tunnel fast convergence such as the LSP fast convergence, or other techniques. The tunnel state detecting module can be located in the control layer of the PE, or in each forwarding engine.

The forwarding module is configured to obtain available routing information according to the routing information and tunnel state information of the at least two tunnels stored in the storage module, and configured to forward service according to the available routing information. For example, when the forwarding engine selects a route forwarding table item stored in the storage module, if the state information of the primary tunnel in the item is unavailable, the service will be forwarded according to the routing information of the backup tunnel in the item. The forwarding module can be located in each forwarding engine of the PE.

Therefore, the method and the PE in the embodiments of the present invention solve the problem how to fast converge the end-to-end service when a terminal node of the tunnel breaks down under the double-ascription network model, which may not be solved by the current MPLS TE FRR technique, therefore avoid the decrease in the service's reliability.

The above illustrated embodiments are just the preferred embodiments of the present invention, and are not used to confine the protection scope of the present invention. Any modification, equivalent substitute or improvement within the spirit of the present invention is covered in the protection scope of the present invention.

The invention claimed is:

1. A method for fast converging an end-to-end service, comprising:
    setting routing information and tunnel state information for each of at least two tunnels, by a double-ascription Provider Edge (PE) of a remote Customer Edge (CE) in the double-ascription PE itself which is connected with a nearby CE, before the nearby CE visits the remote CE,
        wherein, the double-ascription PE connected with the nearby CE serves as an initial node of each of the at least two tunnels, and at least two other PEs connected with the remote CE serve as terminal nodes of the at least two tunnels, respectively, and
        wherein the routing information and the tunnel state information of the at least two tunnels are stored in one route forwarding table in an IP network;
    detecting, by the double-ascription PE of the remote CE, tunnel states to obtain state information of the at least two tunnels;
    selecting, by the double-ascription PE of the remote CE, one or more available tunnels according to the state of each tunnel from the at least two tunnels; and
    forwarding, by the double-ascription PE of the remote CE, service according to the routing information of the available tunnels selected.

2. The method according to claim 1, wherein, each of the tunnels comprises an inner layer tunnel and an outer layer tunnel; the inner layer tunnel is a Virtual Private Network (VPN) tunnel, and the outer layer tunnel is a Label Switching Path (LSP) tunnel or a Genetic Routing Encapsulation (GRE) tunnel or an Internet Protocol Security (IPSec) tunnel.

3. The method according to claim 2, wherein, the step of the setting routing information of at least two tunnels by a double-ascription PE of a remote CE comprises:
    the double-ascription PE of the remote CE setting optimal routing information and suboptimal routing information of the tunnels in the route forwarding table according to pre-configured matching strategies.

4. The method according to claim 3, wherein, the procedure of setting a suboptimal routing information in the route forwarding table is:
    setting the suboptimal routing information in the forwarding item of the optimal routing information in the route forwarding table.

5. The method according to claim 2, wherein, the step of detecting tunnel states to obtain the state information of the at least two tunnels comprises:
    when a control layer of the double-ascription PE of the remote CE determines that some changes take place in the state of the outer layer tunnel of one of the at least two tunnels according to Bidirectional Forwarding Detection (BFD) or tunnel fast convergence techniques, advertising the available/unavailable state information of the tunnel to the forwarding engine.

6. The method according to claim 5, wherein, there is a tunnel state field in the forwarding table of the forwarding engine; and
    the step of advertising the available/unavailable state information of the outer layer tunnel of one of the at least two tunnels to the forwarding engine comprises:
    the double-ascription PE of the remote CE advertising the available/unavailable state information of the outer layer tunnel of one of the at least two tunnels to the route forwarding table of the forwarding engine, and updating the content of state field of the corresponding item.

7. The method according to claim 6, wherein, the at least two tunnels comprise: a primary tunnel and at least one backup tunnel which are mutual backup tunnels; and
    the step of the double-ascription PE of the remote CE selecting one or more available tunnels according to the state of each tunnel from the at least two tunnels comprises:
    when the double-ascription PE of the remote CE needs to forward the service to the remote CE through the primary tunnel, it obtaining and judging the state information of the primary tunnel;
    if the primary tunnel is available, the primary tunnel is selected as an available tunnel;
    if the primary tunnel is unavailable, the at least one backup tunnel is selected as an available tunnel.

8. The method according to claim 6, further comprising: before forwarding the service to the remote CE through the backup tunnel, obtaining the state information of the backup tunnel and confirming that the state information of the backup tunnel is available.

9. The method according to claim 6, wherein, the at least two tunnels are mutual load sharers; and
    the step of the double-ascription PE of the remote CE selecting one or more available tunnels according to the state of each tunnel from the at least two tunnels and forwarding service according to the routing information of the available tunnels selected comprises:
    when the double-ascription PE of the remote CE needs to forward the service to the remote CE through the mutual load sharing tunnels, if it is determined that one of the tunnels is unavailable while others are available according to the state information of the mutual load sharing tunnels, it forwards the service to the remote CE through the available tunnel.

10. The method according to claim 5, wherein, the step of advertising the available/unavailable state information of the outer layer tunnel of one of the at least two tunnels to the forwarding engine comprises:
    the double-ascription PE of the remote CE advertising the available/unavailable state information of the outer layer tunnel of one of the at least two tunnels to an independent storage unit of the forwarding engine, and updating the state information wherein.

11. The method according to claim 10, wherein, the at least two tunnels comprise: a primary tunnel and at least one backup tunnel which are mutual backup tunnels; and the step of the double-ascription PE of the remote CE selecting one or more available tunnels according to the state of each tunnel from the at least two tunnels comprises:

when the double-ascription PE of the remote CE needs to forward the service to the remote CE through the primary tunnel, it obtaining and judging the state information of the primary tunnel;

if the primary tunnel is available, the primary tunnel is selected as an available tunnel;

if the primary tunnel is unavailable, the at least one backup tunnel is selected as an available tunnel.

12. The method according to claim 10, further comprising: before forwarding the service to the remote CE through the backup tunnel, obtaining the state information of the backup tunnel and confirming that the state information of the backup tunnel is available.

13. The method according to claim 10, wherein, the at least two tunnels are mutual load sharers; and the step of the double-ascription PE of the remote CE selecting one or more available tunnels according to the state of each tunnel from the at least two tunnels and forwarding service according to the routing information of the available tunnels selected comprises:

when the double-ascription PE of the remote CE needs to forward the service to the remote CE through the mutual load sharing tunnels, if it is determined that one of the tunnels is unavailable while others are available according to the state information of the mutual load sharing tunnels, it forwards the service to the remote CE through the available tunnel.

14. The method according to claim 5, wherein, the at least two tunnels comprise: a primary tunnel and at least one backup tunnel which are mutual backup tunnels; and the step of the double-ascription PE of the remote CE selecting one or more available tunnels according to the state of each tunnel from the at least two tunnels comprises:

when the double-ascription PE of the remote CE needs to forward the service to the remote CE through the primary tunnel, it obtaining and judging the state information of the primary tunnel;

if the primary tunnel is available, the primary tunnel is selected as an available tunnel;

if the primary tunnel is unavailable, the at least one backup tunnel is selected as an available tunnel.

15. The method according to claim 14, further comprising: before forwarding the service to the remote CE through the backup tunnel, obtaining the state information of the backup tunnel and confirming that the state information of the backup tunnel is available.

16. The method according to claim 5, wherein, the at least two tunnels comprise: the at least two tunnels which are mutual load sharers; and the step of the double-ascription PE of the remote CE selecting one or more available tunnels according to the state of each tunnel from the at least two tunnels and forwarding service according to the routing information of the available tunnels selected comprises:

when the double-ascription PE of the remote CE needs to forward the service to the remote CE through the mutual load sharing tunnels, if it is determined that one of the tunnels is unavailable while others are available according to the state information of the mutual load sharing tunnels, it forwards the service to the remote CE through the available tunnel.

17. A Provider Edge (PE) equipment for fast converging an end-to-end service, comprising:

a storage module;

a tunnel state detecting module; and a forwarding module, wherein:

the PE is a double-ascription PE of a remote Customer Edge (CE) and is connected with a nearby CE;

the storage module is configured to store routing information and tunnel state information for each of at least two tunnels, before the nearby CE visits the remote CE, wherein, the double-ascription PE connected with the nearby CE serves as an initial node of each of the at least two tunnel, and at least two other PEs connected with the remote CE serve as terminal nodes of the at least two tunnels, respectively, and wherein the routing information and tunnel state information for each of the at least two tunnels are stored in one route forwarding table in an IP network, the tunnel state detecting module is configured to detect tunnel states of the at least two tunnels and update the tunnel state information stored in the storing module when the tunnel state is changed, and the forwarding module is configured to select one or more available tunnels according to the state of each tunnel from the at least two tunnels stored in the storing module and forward service according to the routing information of the available tunnels selected.

\* \* \* \* \*

UNITED STATES PATENT AND TRADEMARK OFFICE
CERTIFICATE OF CORRECTION

| | |
|---|---|
| PATENT NO. | : 8,154,986 B2 |
| APPLICATION NO. | : 10/591121 |
| DATED | : April 10, 2012 |
| INVENTOR(S) | : Yi Xiong et al. |

It is certified that error appears in the above-identified patent and that said Letters Patent is hereby corrected as shown below:

In claim 10, column 8, line 67, "wherein", should read -- therein --.

Signed and Sealed this
Nineteenth Day of March, 2013

Teresa Stanek Rea
*Acting Director of the United States Patent and Trademark Office*